(12) United States Patent
Rittmeyer et al.

(10) Patent No.: US 10,330,154 B2
(45) Date of Patent: Jun. 25, 2019

(54) BUG ROLLER BEARING OUTER RACE ASSEMBLY

(71) Applicant: Hamilton Sundstrand Corporation, Windsor Locks, CT (US)

(72) Inventors: Gregory Alan Rittmeyer, Winnebago, IL (US); Timothy R. Welch, Roscoe, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 275 days.

(21) Appl. No.: 15/244,206

(22) Filed: Aug. 23, 2016

(65) Prior Publication Data

US 2016/0356312 A1    Dec. 8, 2016

Related U.S. Application Data

(62) Division of application No. 13/422,169, filed on Mar. 16, 2012, now Pat. No. 9,447,822.

(51) Int. Cl.
*F16C 19/26*     (2006.01)
*F16C 33/58*     (2006.01)
(Continued)

(52) U.S. Cl.
CPC ............ *F16C 33/586* (2013.01); *F16C 19/26* (2013.01); *F16C 35/067* (2013.01);
(Continued)

(58) Field of Classification Search
CPC .. F16C 33/586; F16C 2237/00; F16C 35/067; F16C 35/07; F16C 35/077; F16C 43/045; F16C 2380/26; H02K 15/0006
See application file for complete search history.

(56) References Cited

U.S. PATENT DOCUMENTS 3,777,195 A    12/1973  Pottter
3,990,753 A    11/1976  Kellstrom et al.
(Continued)

FOREIGN PATENT DOCUMENTS

CN    201651044    11/2010
DE    102010039969  3/2012
(Continued)

*Primary Examiner* — David P Bryant
*Assistant Examiner* — Christine Pellazar Bersabal
(74) *Attorney, Agent, or Firm* — Carlson, Gaskey & Olds, P.C.

(57) ABSTRACT

A method for replacing a portion of a first outer bearing assembly for a generator with a second outer bearing assembly. The first outer bearing assembly includes a first liner and a first outer bearing race. The method includes removing the first outer bearing race and the first liner and inserting a second liner. The second liner is matched to a given diameter such that the second outer bearing assembly fits within the generator. A position ring of the second outer bearing assembly is inserted against the machined second liner and a generator housing. A second bearing race of said second outer bearing assembly is inserted against the position ring. The second bearing race of the second outer bearing assembly is connected against the position ring and against a generator housing.

13 Claims, 3 Drawing Sheets

(51) Int. Cl.
*H02K 15/00* (2006.01)
*H02K 5/173* (2006.01)
*F16C 35/067* (2006.01)

(52) U.S. Cl.
CPC ....... *H02K 5/1732* (2013.01); *H02K 15/0006* (2013.01); *F16C 2237/00* (2013.01); *F16C 2380/26* (2013.01)

(56) References Cited

U.S. PATENT DOCUMENTS

| | | |
|---|---|---|
| 4,226,485 A | 10/1980 | Pruvot |
| 4,252,035 A | 2/1981 | Cordner et al. |
| 4,473,309 A | 9/1984 | Box |
| 4,682,938 A | 7/1987 | Riordan |
| 4,685,184 A * | 8/1987 | Satkamp ............... B23P 15/003 29/447 |
| 4,728,841 A | 3/1988 | Sugden |
| 5,073,039 A | 12/1991 | Shervington |
| 5,300,848 A | 4/1994 | Huss et al. |
| 5,456,538 A | 10/1995 | Honda et al. |
| 5,586,826 A | 12/1996 | Kellstrom et al. |
| 6,132,097 A | 10/2000 | Kellstrom |
| 6,260,667 B1 | 7/2001 | Sugden |
| 7,178,325 B2 | 2/2007 | Arbona |
| 7,627,941 B2 | 12/2009 | Shervington et al. |
| 8,556,518 B2 | 10/2013 | Shahamat et al. |

FOREIGN PATENT DOCUMENTS

| | | | |
|---|---|---|---|
| EP | 0800011 A2 * | 10/1997 | ............. B60B 27/00 |
| JP | 2010242951 | 10/2010 | |
| WO | 9414865 | 6/1995 | |

* cited by examiner

BUG ROLLER BEARING OUTER RACE ASSEMBLY

CROSS-REFERENCE TO RELATED APPLICATIONS

This disclosure is a divisional of U.S. patent application Ser. No. 13/422,169 filed Mar. 16, 2012.

BACKGROUND OF THE INVENTION

The present invention relates to a generator and more particularly to a generator bearing in which bearing skew is minimized.

Generators for generating electricity in aircraft applications are generally operated at high speeds, e.g., over 10,000 rpm. At such high operating speeds, a failure of the rotor bearings can cause damage. Such high speed revolutions per minute also tend to wear the bearings and their races prematurely if either of the bearings or the races become misaligned.

SUMMARY OF THE INVENTION

In one exemplary embodiment, a method for replacing a portion of a first outer bearing assembly for a generator with a second outer bearing assembly. The first outer bearing assembly includes a first liner and a first outer bearing race. The method includes removing the first outer bearing race and the first liner and inserting a second liner. The second liner is matched to a given diameter such that the second outer bearing assembly fits within the generator. A position ring of the second outer bearing assembly is inserted against the machined second liner and a generator housing. A second bearing race of said second outer bearing assembly is inserted against the position ring. The second bearing race of the second outer bearing assembly is connected against the position ring and to said generator housing.

In a further embodiment of the above, the connecting of the second bearing race includes bolting the second bearing race to each of the position ring and the generator housing.

In a further embodiment of any of the above, the second bearing race includes a first body that has a radially inner surface for contacting bearings. The surface has a right side and a left side. A chamfer is attached to the right side of the radially inner surface for leading the bearings into contact with the radially inner surface. A right surface extends radially outwardly from the chamfer. A left surface extends radially outwardly from the left side. A ledge extends axially from the left surface and in parallel to and in register with the radially inner surface. A first angled surface extends radially outwardly from the right surface and axially towards the left surface. A second angled surface extends radially outwardly from the ledge and axially towards the right surface. A first extension extends radially outwardly from and attaches to the first angled surface and the second angled surface.

In a further embodiment of any of the above, the first extension includes an opening for receiving a bolt.

In a further embodiment of any of the above, the positioning ring includes a radially extending second body that has a second extension extending axially from a top portion of the first body for engaging a top portion of the first extension. A third extension extends axially from a bottom portion of the first body for engaging a liner disposed in the generator housing.

In a further embodiment of any of the above, the positioning ring includes an opening for receiving a bolt disposed in the radially extending second body.

In a further embodiment of any of the above, the second extension and the third extension extend from opposite sides of the radially extending second body.

In a further embodiment of any of the above, the positioning ring further includes a finger that extends radially outwardly from the third extension for engaging the liner.

In a further embodiment of any of the above, the second bearing race includes a first body that has a radially inner surface for contacting bearings. The radially inner surface has a right side and a chamfer attaches to the right side of the radially inner surface for leading the bearings into contact with the radially inner surface attach.

In a further embodiment of any of the above, the second bearing race includes an attachment for attaching the position ring to the housing and the second bearing race to the position ring.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
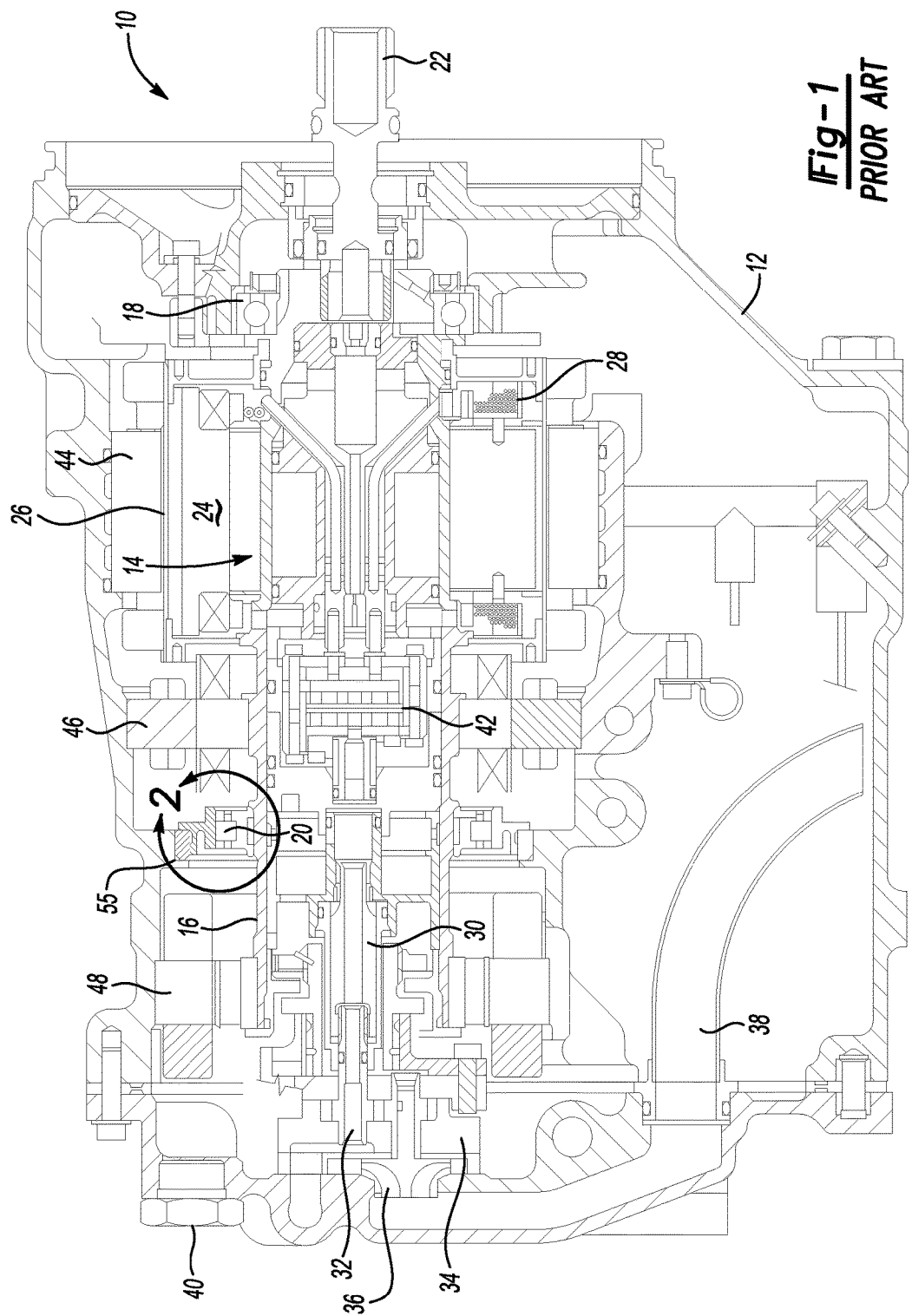
FIG. 1 is a cross-sectional view of a known embodiment of a generator including a prior art bearing.

FIG. 1 shows the cross-sectional view of a generator 10. The generator 10 is, for example, a generator for supplying electricity to an aircraft. The generator shown in FIG. 1 is, e.g., of the type used as a back-up generator for a Boeing 777. The basic structure of such a generator 10 is known in the art.

The generator 10 includes a main housing 12 in which a rotor, generally designated by the reference numeral 14, is supported. The rotor 14 includes a rotor shaft 16 supported in the housing 12 by ball bearing 18 and roller bearing structure 20. The rotor shaft includes an input shaft 22 which is connected to a driving source, e.g., a gear box shaft from a reducing gear box from the engine. The rotor 14 includes a rotor core 24, a rotor sleeve 26 and main field windings 28. The anti-drive end of the rotor 14, i.e., the end opposite the input shaft 22, includes a pump drive section 30 connected to a pump gear set 32 for operating a supply pump 34 having pump impeller 36 connected to scavenge inlet 38. A vacuum brake valve 40 is also provided.

The rotor 14 is provided with a rectifier bridge 42, while the housing 12 is also provided with a main armature 44, an exciter stator 46 and a permanent magnet generator (PMG) armature 48. Such a generator can generate electricity for the electrical system of an aircraft as is known in the art.

Figure 2:
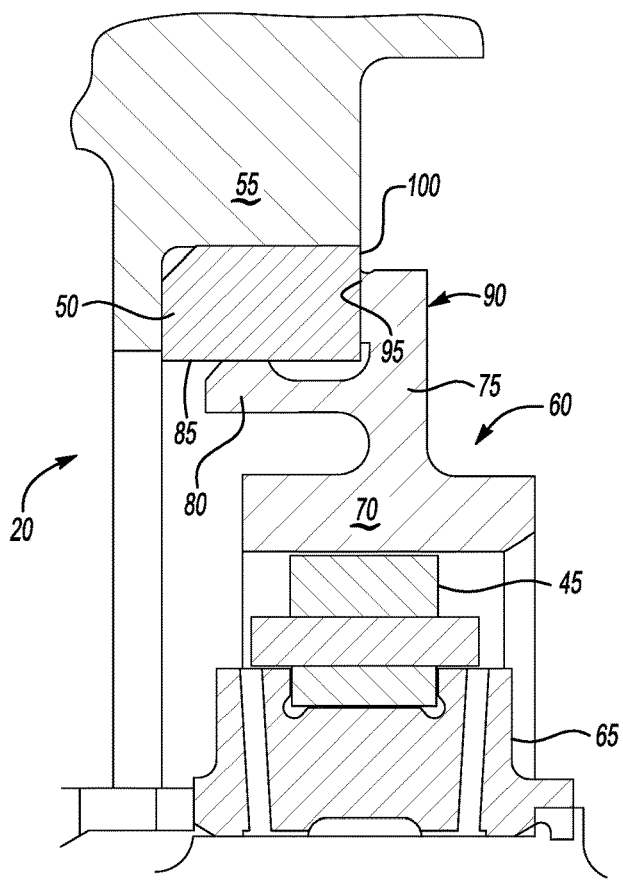
FIG. 2 is an enlarged cross-sectional view taken along the line 2-2 showing the prior art bearing in more detail.

Referring now to FIG. 2, a prior art roller bearing 20 is shown in detail. The bearing structure 20 includes a roller bearing(s) 45, a cylindrical liner 50 that is interference fitted into a bearing housing 55, an outer bearing race 60 and an inner bearing race 65 having a given diameter. The outer bearing race 60 has a roughly rectangular bearing block 70, a flange 75 extending radially outward from the bearing block 70, a spring arm 80 extending at a right angle to the flange 75, the spring arm attaching to a radially inward surface 85 of the housing and a top portion 90 extending from flange 75, the top portion 90 attaching at a left side 95 thereof to a right side 100 of the liner 50. The liner 50 is an interference fit with the bearing housing and the spring arm 80 thereon.

During operation of the prior art bearing 20, however, it has been discovered that as the housing 12 heats up during operation, the amount of interference fit that tapers the bearing block 70 may cause the bearings 45 to skew, which may limit the life of the bearings 45.

Figure 3:
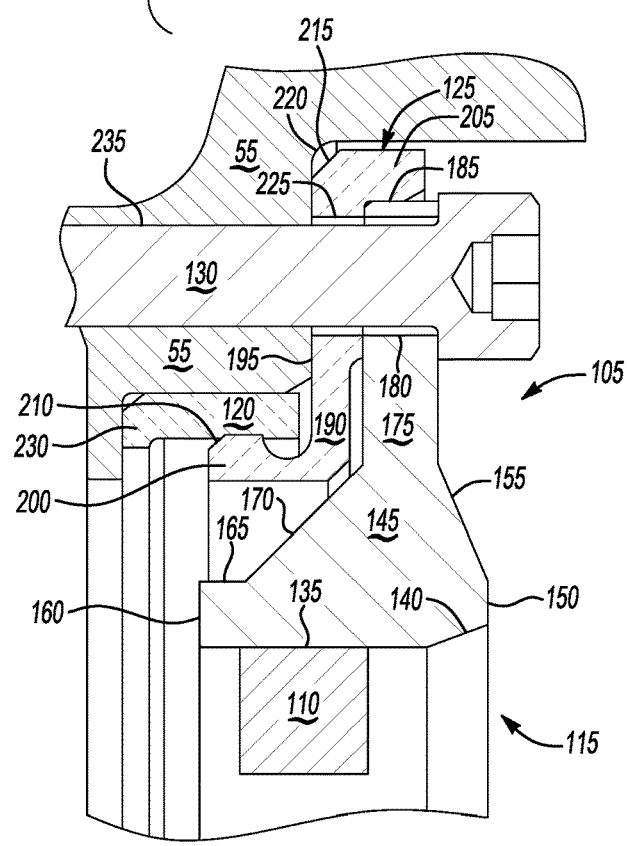
FIG. 3 is an enlarged cross-sectional view of an embodiment of a bearing for use in the generator in place of the prior art bearing.

Referring to FIG. 3, a cylindrical bearing structure 105 that minimizes skew on the bearing(s) 110 is shown according to an embodiment of the invention. The cylindrical bearing structure 105 includes an outer bearing race 115, a liner 120, bearing housing 55, and a position ring 125. The liner 120 is interference fit into the bearing housing 55 and the race 115 and the position ring 125 are attached to the housing 55 by an attachment 130 such as a bolt or screw 130 or the like. The bearing structure 105 is designed to fit in the same envelope filled by the bearing structure 20.

The outer bearing race 115 has a roughly triangular body 145 that is defined by a radially inner race surface 135, a chamfer 140 functioning as a bearing 110 lead-in surface and angling radially outwardly and to a right side surface 150 extending radially outwardly from the chamfer 140, a left side surface 160 extending radially outwardly from said inner race surface 135, a first angled surface 155 extending radially outwardly from the right side surface 150 and axially towards the left side surface 160, a ledge 165 extending axially from the left side surface 160 and parallel to the inner race surface 135, a second angled surface 170 extending radially outwardly from the ledge 165 and axially towards the right side surface 150, and a roughly rectangular extension 175 attaching to the first angled surface 155 and the second angled surface 170. The extension 175 has a top surface 185 and an opening 180 for receiving the bolt 130 therethrough.

The cylindrical position ring 125 has a generally s-shaped body 190. The position ring 125 functions to align the outer bearing race 115 with the inner bearing race 65 and acts as a spring to maintain contact with the liner 120 that is in an interference fit with the housing 55. The body 190 has a vertical portion 195, a bottom portion 200 extending towards the liner 120 and a top portion 205 extending over and fitting with the top surface 185 of the outer bearing race 115. The bottom portion 200 has an upwardly extending finger 210 for maintaining contact with the liner 120 into the housing 55. A chamfer 215 exists between the vertical portion 195 and the top portion 205 to enable the position ring 125 to be placed against the housing 55 without interfering with a curved portion 220 of the housing 55. The vertical portion 195 has a hole 225 therein that aligns with the opening 180 in the outer bearing race 115 for receiving the bolt 130 therethrough.

By moving the function of the spring arm 80 to the position ring 125, there is no taper placed on the outer bearing race 115. Taper is reduced from about 0.0013"/inch or 0.033/mm to about 0.0002"/inch or 0.00508/mm from the prior art to the instant disclosure. Bearing skew is reduced and bearing life extended. The remaining taper may be caused by normal thermal distortion or machining tolerances.

Figure 4:
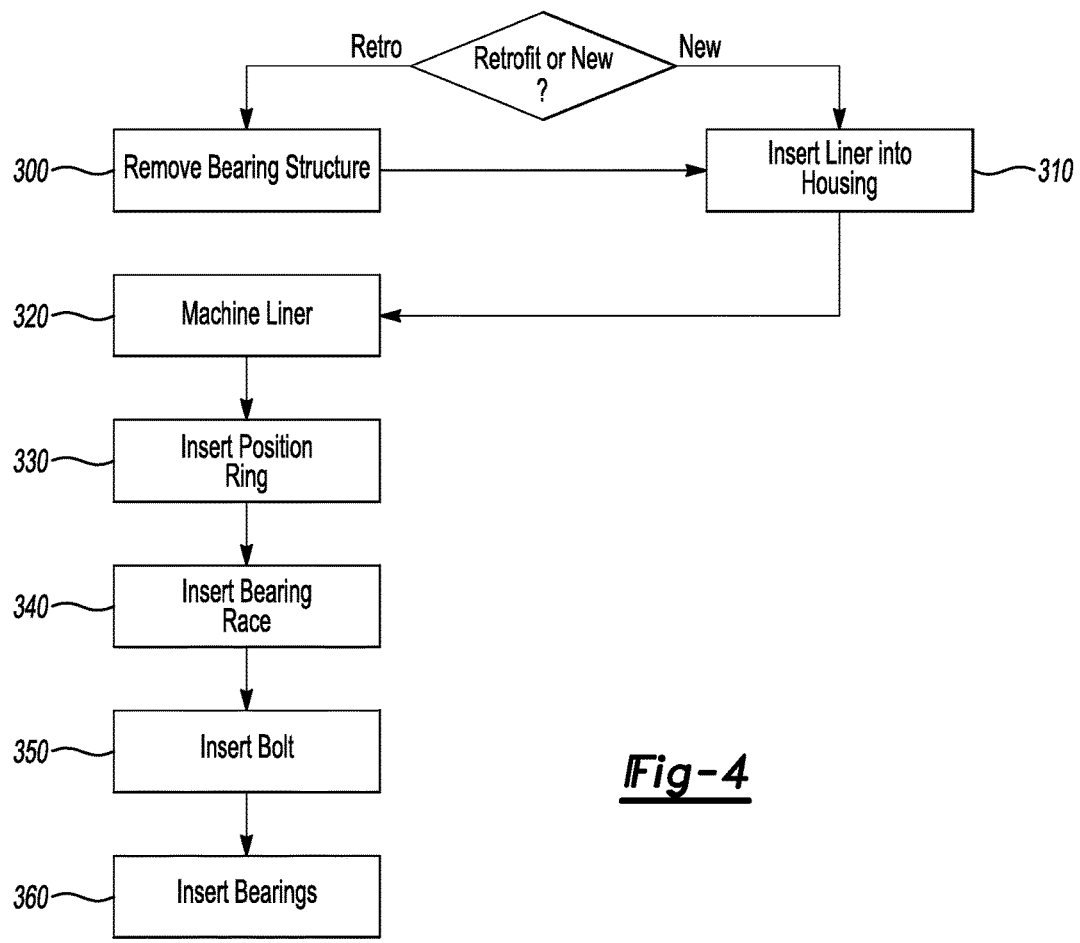
FIG. 4 shows a method of constructing the bearing of FIG. 3.

Referring now to FIG. 4, to retrofit the outer bearing race into the generator 10, the bearing structure 20 including liner 50 is removed (step 300). The liner 120 is installed in place (step 310) and machined in place until that allows the same spacing for the bearing race 115 and position ring 125 as in the bearing block 70 (step 320). The liner 120 is left with radially inwardly depending portion 230 that is harder to machine away and not necessary to remove. The housing 55 has an aperture 235 therethrough to receive bolt 130 and that is to be aligned with the hole 225 in the vertical portion 195 and the opening 180 in the outer bearing race 115. The position ring 125 is then inserted in the housing 55 with its finger 210 abutting the liner 120 (step 330) and the bearing race 115 is inserted in the position ring 125 with its top surface 185 nested under the upper portion 205 (step 340). The bolt 130 is then inserted through the opening 180 in the outer bearing race 115, the hole 225 in the vertical portion 195, and into the aperture 235 (step 350). The bearings 110 are then inserted into the radially inner race surface 135 by the chamfer surface 140 (step 360). For new construction, a liner 120 is fitted into the housing 55 as with the prior art, e.g. press fit or by expanding the housing 55 by heat or the like (step 310).

The preceding description is exemplary rather than limiting in nature. One of ordinary skill in the art may use the teachings herein to apply a new bearing race to other types of machinery. Variations and modifications to the disclosed examples may become apparent to those skilled in the art that do not necessarily depart from the essence of this disclosure. The scope of legal protection given to this disclosure can only be determined by studying the following claims.

The invention claimed is:

1. A method for replacing a portion of a first outer bearing assembly for a generator with a second outer bearing assembly, said first outer bearing assembly including a first liner and a first outer bearing race, said method comprising:
   removing said first outer bearing race and said first liner;
   inserting a second liner;
   machining said second liner to a given diameter such that said second outer bearing assembly fits within said generator;
   inserting a position ring of said second outer bearing assembly against said machined second liner and a generator housing;
   inserting a second bearing race of said second outer bearing assembly against said position ring; and
   connecting said second bearing race of said second outer bearing assembly against said position ring and to said generator housing.

2. The method of claim 1, wherein said connecting of said second bearing race includes bolting said second bearing race to each of said position ring and said generator housing.

3. The method of claim 1, wherein said second bearing race includes:
   a first body, said first body having:
      a radially inner surface contacting bearings and said radially inner surface having a right side and a left side;
      a chamfer attaching to said right side of said radially inner surface, said chamfer directs said bearings into contact with said radially inner surface;
      a right surface extending radially outwardly from said chamfer;
      a left surface extending radially outwardly from said left side;

a ledge extending axially from said left surface and in parallel to and in register with said radially inner surface;

a first angled surface extending radially outwardly from the right surface and axially towards the left surface;

a second angled surface extending radially outwardly from the ledge and axially towards the right surface; and a first extension extending radially outwardly from and attaching to the first angled surface and the second angled surface.

4. The method of claim 3, wherein said first extension includes an opening that receives a bolt.

5. The method of claim 3, wherein said positioning ring comprises:

a radially extending second body, said radially extending second body having:

a second extension extending axially from a top portion of said first body that engages a top portion of said first extension; and a third extension extending axially from a bottom portion of said first body that engages a liner disposed in said generator housing.

6. The method of claim 5, wherein said positioning ring includes an opening that receives a bolt disposed in said radially extending second body.

7. The method of claim 5, wherein said second extension and said third extension extend from opposite sides of said radially extending second body.

8. The method of claim 5, wherein said positioning ring further comprises:

a finger extending radially outwardly from said third extension that engages said liner.

9. The method of claim 1, wherein said second bearing race includes a first body having a radially inner surface for contacting bearings, said radially inner surface having a right side, and a chamfer attaching to said right side of said radially inner surface for leading said bearings into contact with said radially inner surface.

10. The method of claim 9, wherein the second bearing race includes an attachment that attaches said position ring to said housing and said second bearing race to said position ring.

11. The method of claim 1, wherein said position ring is located between said second liner and said second bearing race.

12. The method of claim 1, wherein inserting said second liner includes interference fitting said second liner against said generator housing.

13. The method of claim 12, wherein said second liner is machined after being interference fit against said generator housing.

* * * * *